US008166069B2

(12) United States Patent
Sample et al.

(10) Patent No.: US 8,166,069 B2
(45) Date of Patent: Apr. 24, 2012

(54) DISPLAYING AGGREGATED NEW CONTENT BY SELECTED OTHER USER BASED ON THEIR AUTHORIZATION LEVEL

(75) Inventors: Neal Sample, Santa Cruz, CA (US); F. Randall Farmer, Palo Alto, CA (US); Ericson DeJesus, San Francisco, CA (US); Ellen Sue Perelman, San Francisco, CA (US); Mark Everett Hull, San Jose, CA (US)

(73) Assignee: Yahoo! Inc., Sunnyvale, CA (US)

( * ) Notice: Subject to any disclaimer, the term of this patent is extended or adjusted under 35 U.S.C. 154(b) by 0 days.

(21) Appl. No.: 11/392,247

(22) Filed: Mar. 29, 2006

(65) Prior Publication Data
US 2006/0230061 A1  Oct. 12, 2006

Related U.S. Application Data

(63) Continuation-in-part of application No. 10/832,172, filed on Apr. 26, 2004, now Pat. No. 7,269,590.

(60) Provisional application No. 60/540,505, filed on Jan. 29, 2004, provisional application No. 60/544,639, filed on Feb. 13, 2004.

(51) Int. Cl.
G06F 7/00 (2006.01)
G06F 17/30 (2006.01)
(52) U.S. Cl. ........................................ 707/783; 707/784
(58) Field of Classification Search .................. 707/3, 4, 707/104.1
See application file for complete search history.

(56) References Cited

U.S. PATENT DOCUMENTS

| 5,835,087 A | 11/1998 | Herz et al. |
| 5,950,193 A | 9/1999 | Kulkarni |
| 5,996,006 A | 11/1999 | Speicher |
| 6,029,141 A | 2/2000 | Bezos et al. |

(Continued)

FOREIGN PATENT DOCUMENTS
JP   2004-272423   9/2004

OTHER PUBLICATIONS

"A Sneak Preview of the Christian Connection Matchmaker Match Page", archive.org website of www.christian.matchmaker.com, Feb. 23, 1999.

(Continued)

*Primary Examiner* — Rehana Perveen
*Assistant Examiner* — Raheem Hoffler
(74) *Attorney, Agent, or Firm* — Greenberg Traurig, LLP (57) ABSTRACT

Enabling a content publisher and a receiving user to control access to content updates based on user relationships. The content publisher and the receiving user may assign a relationship degree, relationship category, and/or relationship rating to each other and to other users. The content publisher and/or receiving user also specify a required relationship that is needed to access or accept a content update. The content publisher and receiving user may further specify acceptable types of content updates, such as blog entries, product reviews, photos, and the like that are accessible or acceptable. Upon logon or other event, a summary of content updates is provided to each receiving user that meets each content publisher's required relationship, and the content updates are delivered according to a selected delivery method from those content publishers that meet the relationship requirements of the receiving users. Delivery includes email, instant message, RSS feeds, and the like.

20 Claims, 7 Drawing Sheets

U.S. PATENT DOCUMENTS

| | | | |
|---|---|---|---|
| 6,129,141 | A | 10/2000 | Yang et al. |
| 6,175,831 | B1 | 1/2001 | Weinreich et al. |
| 6,269,369 | B1 | 7/2001 | Robertson |
| 6,296,369 | B1 | 10/2001 | Liao |
| 6,324,541 | B1 | 11/2001 | de l'Etraz et al. |
| 6,327,573 | B1 | 12/2001 | Walker et al. |
| 6,356,879 | B2 | 3/2002 | Aggarwal et al. |
| 6,433,795 | B1 | 8/2002 | MacNaughton et al. |
| 6,449,344 | B1 | 9/2002 | Goldfinger et al. |
| 6,466,917 | B1 | 10/2002 | Goyal et al. |
| 6,606,657 | B1 | 8/2003 | Zilberstein et al. |
| 6,681,247 | B1 | 1/2004 | Payton |
| 6,714,931 | B1 | 3/2004 | Papierniak et al. |
| 6,745,178 | B1 | 6/2004 | Emens et al. |
| 6,879,994 | B1 | 4/2005 | Matsllach et al. |
| 6,993,325 | B1 | 1/2006 | Waesterlid |
| 7,080,117 | B2 | 7/2006 | Pinto et al. |
| 7,143,052 | B2 | 11/2006 | LaSalle et al. |
| 7,167,910 | B2 | 1/2007 | Farnham et al. |
| 7,200,638 | B2 | 4/2007 | Lake |
| 7,290,285 | B2 | 10/2007 | McCurdy et al. |
| 7,366,759 | B2* | 4/2008 | Trevithick et al. ............ 709/206 |
| 7,536,637 | B1* | 5/2009 | Nauerz et al. ................. 715/230 |
| 7,558,759 | B2 | 7/2009 | Valenzuela et al. |
| 7,613,769 | B1* | 11/2009 | Hess .............................. 709/203 |
| 2001/0032245 | A1 | 10/2001 | Fodor |
| 2002/0023132 | A1 | 2/2002 | Tornabene et al. |
| 2002/0023230 | A1* | 2/2002 | Bolnick et al. ................. 713/202 |
| 2002/0059201 | A1* | 5/2002 | Work ................................ 707/3 |
| 2002/0099806 | A1 | 7/2002 | Balsamo et al. |
| 2002/0103797 | A1* | 8/2002 | Goel et al. .......................... 707/5 |
| 2002/0103801 | A1 | 8/2002 | Lyons |
| 2002/0107242 | A1 | 8/2002 | Sabb et al. |
| 2002/0116466 | A1 | 8/2002 | Trevithick et al. |
| 2002/0124053 | A1 | 9/2002 | Adams et al. |
| 2003/0037114 | A1 | 2/2003 | Nishio et al. |
| 2003/0050977 | A1 | 3/2003 | Puthenkulam et al. |
| 2003/0074440 | A1 | 4/2003 | Grabarnik et al. |
| 2003/0105827 | A1 | 6/2003 | Tan et al. |
| 2003/0158855 | A1* | 8/2003 | Farnham et al. .............. 707/102 |
| 2003/0167324 | A1 | 9/2003 | Farnham et al. |
| 2003/0231207 | A1 | 12/2003 | Huang |
| 2004/0044536 | A1 | 3/2004 | Fitzpatrick et al. |
| 2004/0088315 | A1 | 5/2004 | Elder et al. |
| 2004/0088322 | A1 | 5/2004 | Elder et al. |
| 2004/0088325 | A1 | 5/2004 | Elder et al. |
| 2004/0103203 | A1 | 5/2004 | Nichols et al. |
| 2004/0107242 | A1 | 6/2004 | Vert et al. |
| 2004/0119760 | A1 | 6/2004 | Grossman et al. |
| 2004/0122803 | A1* | 6/2004 | Dom et al. ......................... 707/3 |
| 2004/0122855 | A1* | 6/2004 | Ruvolo et al. ............. 707/104.1 |
| 2004/0122881 | A1 | 6/2004 | Mattos et al. |
| 2004/0133440 | A1 | 7/2004 | Carolan et al. |
| 2004/0148275 | A1 | 7/2004 | Achlioptas |
| 2004/0177120 | A1 | 9/2004 | Kirsch |
| 2004/0215648 | A1 | 10/2004 | Marshall et al. |
| 2004/0215793 | A1 | 10/2004 | Ryan et al. |
| 2005/0015432 | A1 | 1/2005 | Cohen |
| 2005/0015455 | A1 | 1/2005 | Liu |
| 2005/0076021 | A1* | 4/2005 | Wu et al. ............................ 707/3 |
| 2005/0125408 | A1* | 6/2005 | Somaroo et al. ................ 707/10 |
| 2005/0209861 | A1 | 9/2005 | Hewes et al. |
| 2005/0216300 | A1* | 9/2005 | Appelman et al. ................ 705/1 |
| 2006/0004703 | A1* | 1/2006 | Spivack et al. .................... 707/2 |
| 2006/0021009 | A1* | 1/2006 | Lunt ................................. 726/4 |
| 2006/0218153 | A1* | 9/2006 | Voon et al. ...................... 707/10 |
| 2006/0242128 | A1* | 10/2006 | Goel ................................. 707/3 |
| 2007/0027921 | A1* | 2/2007 | Alvarado et al. .......... 707/104.1 |

OTHER PUBLICATIONS

"A Sneak Preview of the Christian Connection Matchmaker Search Page", archive.org website of www.christian.matchmaker.com, May 8, 1999.

"FAQs About the ZeroDegrees Service," visited on Sep. 8, 2004, <http://www.zerodegrees.com/faq.htm>.

"The Purpose Principles and Process", archive.org website of www. christian.matchmaker.com, Feb. 24, 1999.

"Welcome to the Christian Connection Matchmaker", archive.org website of www.christian.matchmaker.com, Feb. 21, 1999.

"Yahoo! Groups-Getting Started, Groups Account, Groups Features", archive.org website of www.yahoo.com, Oct. 31, 2002.

"Yahoo! Groups-What Is a Group?", archive.org website of www.yahoo.com, Nov. 3, 2002.

"Yahoo! Groups-What is the spam policy of Yahoo! Groups? How do I avoid spam?", archive.org website of www.yahoo.com, Oct. 24, 2002.

Jason Ethier, "Current Research in Social Network Theory," <http://upaya.soc.neu.edu/archive/students/Ethier-SocialNetworks.html>.

Jordan et al., "The Augmented Social Network: Building identity and trust into the next-generation internet", first monday Peer-Reviewed Journal on the Internet, www.firstmonday.dk/issues/issue8_8/jordan/, pp. 1-64.

Lorrie Faith Cranor et al., "Spam," Communications of the ACM, Aug. 1988, pp. 74-83, vol. 41, No. 8.

Matchmaker.com Disclaimer, web.archive.org webpage of Apr. 20, 2000, web.archive.org/web/20000420114350/www.Christian.matchmaker.com/rules.

Matt Hines, "America Online proposes Love.com," Dec. 10, 2003<http://news.com.com/2100-1032-5118986.html>.

Matt Hines, "AOL serves up software for BREW", Dec. 9, 2003<http://news.com.com/2100-1038-5117886.html>.

Member site Selection Page for Matchmaker.com, web.archive.org webpage of Feb. 19, 1999, web.archive.org/web/19990219183131/matchmaker.com/newtry.shtml.

Merrick, Amy; "The Best Way to . . . Find a Date—Ok, so true love Isn't guaranteed; But there are ways to better the odds", Wall Street Journal, New York, NY, p. R 16, ProQuest ID 64669169, Nov. 27, 2000.

Richard V. Dragan, "Tribe.net (beta)," PC Magazine, Jan. 20, 2004, <http//:www.pcmag.com/article2/0,1759,1418688,00.asp>.

Timothy J. Mullaney, "Diller's Latest Little Bet on the Net", BusinessWeek Online, Mar. 1, 2004,<http://www.businessweek.com/print/technology/content/mar2004/tc20040031_2820_tc119.h...>.

Welcome to the Christian Connection Matchmaker, web archive.org webpage of Feb. 22, 1999, web.archive.org/web/19990222170152/http://www.Christian.email.net/index/html.

International Search Report dated Oct. 3, 2006, for International Application PCT/US04/38696, filed Nov. 17, 2004.

International Preliminary Report on Patentability dated Dec. 14, 2006 issued for corresponding International Patent Application No. PCT/US2004/038703.

"FAQs About the ZeroDegrees Service," visited on Sep. 8, 2004, http://www.zerodegrees.com/faq.htm, 35 pp.

"System Names and Numbers," archive.org website of www:christian.matchmaker.com, Apr. 24, 1999, 3 pp.

"Matchmaker User Tools Pages" archive.org website of www.christian.matchmaker.com, Apr. 24, 1999, 2 pp.

"Matchmaker Help—Block," archive.org website of www.christian.matchmaker.com, Sep. 10, 1999, 1 pg.

"Matchmaker Help—Main Page" archive.org website of www.christian.matchmaker.com, Oct. 4, 1999, 3 pp.

International Search Report and Written Opinion dated Jun. 7, 2005, from International Application No. PCT/US04/38704, 16 pgs.

International Search Report and Written Opinion of the International Searching Authority, mailed Oct. 3, 2006 for International Patent Application PCT/US04/38696 filed on Nov. 17, 2004.

"A Sneak Preview of the Christian Connection Matchmaker Who's On Page" Feb. 24, 1999, 3 pgs, archive.org website of www.christian.matchmaker.com, (accessed Jul. 28, 2007).

Welcome to My Yahoo!, 2 pgs, archive.org website of www.yahoo.com/r/il (accessed Feb. 15, 2007).

MatchMaker Help Pages—Frequently Asked Questions, 7 pgs., archive.org website of www.christian.matchmaker.com (accessed Feb. 15, 2007).

U.S. Appl. No. 10/832,172, Official Communication mailed May 16, 2007.

U.S. Appl. No. 10/832,172, Official Communication mailed Feb. 9, 2007.

U.S. Appl. No. 10/832,172, Official Communication mailed Aug. 23, 2006.
U.S. Appl. No. 10/946,636, Official Communication mailed Feb. 21, 2007.
U.S. Appl. No. 10/946,636, Official Communication mailed Aug. 29, 2006.
U.S. Appl. No. 10/946,630, Official Communication mailed Jul. 27, 2007.
U.S. Appl. No. 10/946,630, Official Communication mailed May 2, 2007.
U.S. Appl. No. 10/946,630, Official Communication mailed Feb. 6, 2007.
U.S. Appl. No. 10/946,630, Official Communication mailed Aug. 16, 2006.
U.S. Appl. No. 10/866,954, Official Communication mailed Aug. 8, 2007.
U.S. Appl. No. 10/866,954, Official Communication mailed Feb. 23, 2007.
U.S. Appl. No. 10/866,954, Official Communication mailed Jul. 26, 2006.
U.S. Appl. No. 10/866,954, Official Communication mailed Feb. 1, 2006.
U.S. Appl. No. 10/866,954, Official Communication mailed Mar. 16, 2005.
U.S. Appl. No. 11/314,201, Official Communication mailed May 17, 2007.
U.S. Appl. No. 11/314,201, Official Communication mailed Nov. 1, 2007.
U.S. Appl. No. 10/863,926, Official Communication mailed Jun. 26, 2007.
U.S. Appl. No. 10/863,926, Official Communication mailed Dec. 29, 2006.
U.S. Appl. No. 10/863,926, Official Communication mailed Aug. 14, 2006.
U.S. Appl. No. 10/863,926, Official Communication mailed Feb. 28, 2006.
U.S. Appl. No. 10/863,926, Official Communication mailed Sep. 9, 2005.
U.S. Appl. No. 10/863,926, Official Communication mailed Apr. 6, 2005.
Written Opinion dated Oct. 3, 2006, for International Application PCT/US04/38696, filed Nov. 17, 2004.
U.S. Appl. No. 10/946,636, Official Communication mailed Jul. 27, 2007.
Non-Final Office Action for U.S. Appl. No. 10/946,636 mailed Dec. 13, 2007.
The Official America Online for Windows Tour Guide, Second Edition. Copyright 1994 Tom Lichty. pp. 239-256.
U.S. Patent and Trademark Office, Office Communication mailed Feb. 9, 2009 for corresponding U.S. Appl. No. 10/934,636.
U.S. Patent and Trademark Office Communication mailed Jul. 9, 2009 for corresponding U.S. Appl. No. 11/314,206.
U.S. Patent and Trademark Office Communication mailed May 14, 2009 for corresponding U.S. Appl. No. 10/863,926.
U.S. Appl. No. 10/946,630, Official Communication mailed May 28, 2008.
U.S. Appl. No. 10/863,926, Official Communication mailed Apr. 16, 2008.
U.S. Appl. No. 10/863,926, Official Communication mailed Aug. 1, 2008.
U.S. Appl. No. 10/863,926, Official Communication mailed Apr. 1, 2009.
U.S. Appl. No. 11/392,247, Official Communication mailed Jan. 21, 2009.
PCT Preliminary Report on Patentability for Application No. PCT/US2004/038707 mailed Aug. 10, 2006.
PCT Preliminary Report on Patentability for Application No. PCT/US2004/038705 mailed Oct. 26, 2006.
"Design Center Tutorial: Preview and Test Dynamic Pages On a Testing Server," Adobe.com, 6 pages, http://www.adobe.com/designcenteadreamweaver/articles/drw8at_testserver.html (accessed Sep. 2, 2008).
U.S. Appl. No. 10/946,630, Official Communication mailed Jun. 12, 2009.
"A Sneak Preview of the Christian Connection Matchmaker Match Page," Singles Matchmaker—Largest Site on the Net for Singles, Dating, Personals, Chat, E-mail, 2 pages, http://web.archive.org/web/19990223221053/www.christian.matchmaker.com/ppmatch (accessed Jan. 25, 2006).
"A Sneak Preview of the Christian Connection Matchmaker Search Page," Singles Matchmaker—Largest Site on the Net for Singles, Dating, Personals, Chat, E-mail, 2 pages, http://web.archive.org/web/19990508232314/www.christian.matchmaker.com/ppsearch (accessed Jan. 25, 2006).
"A Sneak Preview of the Christian Connection Matchmaker Who's On Page," Singles Matchmaker—Largest Site on the Net for Singles, Dating, Personals, Chat, E-mail, 3 pages, http://web.archive.org/web/19990224012014/www.christian.matchmaker.com/ppwho (accessed Jul. 28, 2007).
"The Matchmaker Network Systems Page," System Names and Numbers, 3 pages, http://web.archive.org/web/19990424123143/www.christian.matchmaker.com/systems (accessed Feb. 15, 2007).
"The Purpose Principles and Process", Matchmaker, 3 pages, http://web.archive.org/web/19990224045035/www.christian.matchmaker.com/process (accessed Jan. 25, 2006).
"Welcome to the Christian Connection Matchmaker!," The Premier Site for Singles, Dating, Personals, Chat, E-mail, 1 page, http://web.archive.org/web/19990221092342/www.christian.matchmaker.com/main (accessed Jan. 25, 2006).
"Groups: Getting Started; Your Yahoo! Groups Account; Yahoo! Groups Features; Other Yahoo! Groups Questions," Yahoo! Groups—Groups, 1 page, http://web.archive.org/web/20021017061719/http://help.yahoo.com/help/groups (accessed Jan. 26, 2006).
"What is a Group?," Yahoo! Groups, 1 page, http://web.archive.org/web/20021103223155/www.yahoo.com/r/ub (accessed Jan. 26, 2006).
"What is the spam policy in Yahoo! Groups? How do I avoid spam?," Yahoo! Groups, 1 page, http://web.archive.org/web/20021024130230/help.yahoo.com/help/us/groups/groups-05.html (accessed Jan. 26, 2006).
Non-Final Office Action mailed Jan. 8, 2008 for U.S. Appl. No. 10/866,954 filed Jun. 14, 2004.
Final Office Action mailed Dec. 17, 2007 for U.S. Appl. No. 10/863,926 filed Jun. 8, 2004.
U.S. Patent and Trademark Office Communication mailed Mar. 10, 2009 for corresponding U.S. Appl. No. 10/946,630.
U.S. Patent and Trademark Office Communication mailed Sep. 2, 2009 for corresponding U.S. Appl. No. 10/866,954.
Amrit Tiwana; Ashley Bush—"A Social Exchange Architecture for Distributed Web Communities" 2001, Journal of Knowledge Management, 5,3, ABI/INFORM Global, p. 242-248.

* cited by examiner

DISPLAYING AGGREGATED NEW CONTENT BY SELECTED OTHER USER BASED ON THEIR AUTHORIZATION LEVEL

CROSS-REFERENCE TO RELATED APPLICATIONS

This application claims the benefit of U.S. Utility application Ser. No. 10/832,172 filed on Apr. 26, 2004, the benefit of the earlier filing date of which is hereby claimed under 35 U.S.C. §120 and which is further hereby incorporated by reference.

FIELD OF ART

The present invention relates generally to computing software for managing display of content, and more particularly to a method and system for enabling a user to control a view of content recently posted by a related content publisher, and enabling the content publisher to control which co-users are able to view recently published content.

BACKGROUND

Many computing systems enable a user to control access to information through passwords, encryption keys, presence settings, and/or other methods. Some online systems enable a user to enter information about the user and enable the user to control whether, how, or which information is accessible to other users. For example, some online systems enable a user to enter a profile of information and establish a group of contacts. Such systems may enable only those contacts to access the profile information and/or detect whether the user is currently logged into an online service, such as a messaging service, a job placement service, or other topic-specific service. The set of contacts comprise a network of people who know a user well enough to provide their contact information. This is sometimes considered a single-level social network.

More broadly, a social network typically comprises a person's set of direct and indirect personal relationships. Direct personal relationships usually include relationships with family members, friends, colleagues, coworkers, and other people with which the person has had some form of direct contact, such as contact in person, by telephone, by email, by instant message, by letter, and the like. These direct personal relationships are sometimes referred to as first degree relationships. First degree relationships can have varying degrees of closeness, trust, and other characteristics. These relationships can also be unidirectional or bidirectional. A unidirectional relationship typically means that a first person is willing and able to interact with a second person, but the second person is not willing or able to interact with the first person. Conversely, a bidirectional relationship typically means that both people are willing and able to interact with each other.

Indirect personal relationships typically include relationships through first degree relationships to other people with whom a person has not had some form of direct contact. For example, a friend of a friend represents an indirect personal relationship. A more extended, indirect relationship might be a friend of a friend of a friend. These indirect relationships are sometimes characterized by a degree of separation between the people. For instance, a friend of a friend can be characterized as a second degree relationship.

Online social network services have developed based on specific topics, such as job placement and dating. These online social network services enable users to connect with each other if they did not previously know each other, but may share a common interest. After a connection is made, the users may view profile information about each other and/or send messages to each other, but there is little else for the users to do through the online network service. The users may be notified of new profile information posted by a connected co-user, but the user generally does not have any other control over which co-users from which to receive new information. Generally, the user also does not have control over which type of new information the user wishes to receive from co-users. Similarly, content publishers generally do not have control over which co-users are provided with new information. Generally, the content publisher also does not have control over which type of new information the content publisher wishes to publish to co-users.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description of the Invention, which is to be read in association with the accompanying drawings, wherein.

DETAILED DESCRIPTION OF EMBODIMENTS

The present invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

The terms "comprising," "including," "containing," "having," and "characterized by," refer to an open-ended or inclusive transitional construct and does not exclude additional, unrecited elements, or method steps. For example, a combination that comprises A and B elements, also reads on a combination of A, B, and C elements. The meaning of "a," "an," and "the" include plural references. The meaning of "in" includes "in" and "on." Additionally, a reference to the singular includes a reference to the plural unless otherwise stated or is inconsistent with the disclosure herein. The term "or" is an inclusive "or" operator, and includes the term "and/or," unless the context clearly dictates otherwise. The phrase "in one embodiment," as used herein does not necessarily refer to the same embodiment, although it may. Similarly, the phrase "in another embodiment," as used herein does not necessarily refer to a different embodiment, although it may. The term "based on" is not exclusive and provides for being based on additional factors not described, unless the context clearly dictates otherwise. The term "user" can include a computer user, an online service subscriber, an online social network user and/or other person using an electronic device.

The term "social network" can include a group of people with which a user has direct and/or indirect relationships, as well as a service for communicating information to and/or from any of the people with which a user has direct and/or indirect relationships. However, an indirect relationship can also be through a shared interest, without any degree of personal relationship between intermediate people. For example, a set of complete strangers can comprise a social network on the basis of a common interest in a topic or an activity, such as fishing. Thus, the term social network includes a group of people associated by a common interest and/or a service for communicating information to and/or from any of the people with which a user has an interest relationship.

Embodiments of the present invention provide many capabilities to utilize social networks and/or other networks. Personal relationships and/or interest relationships can be utilized to find and develop relevant connections for a variety of activities, such as job networking, service referrals, dating, and the like. Finding and developing relevant connections can be accelerated with online services. However, simply establishing connections and sharing messages may not be sufficiently interesting for some users to keep participating in the network. To foster more vitality in a network environment, embodiments of the present invention enable users to share other information and/or activities, which may encourage regular participation. For example, users may share photos, web log (blog) entries, a list of recommended products or services, information about other users, information about groups to which users belong, and the like. The users may share information with co-users within or outside a closed social network service. Information may also be shared with and/or received from commercial services, such as really simple syndication (RSS) feeds. The users may also participate together in games, and/or other joint activities. When one user adds new information, other related users may be notified. However, embodiments of the present invention enable the other users to control the notifications by controlling relationships between users from which the other users receive notices and/or controlling types of information about which to receive notices. Similarly, embodiments of the present invention enable the publishing users to control the notifications and distribution of new information by controlling relationships between users to which notices and/or controlling types of information are provided.

For example, a user may wish to publish notices about new photos, new blog entries, and new reviews only to family members. The user may generally wish to send the notices and a summary of the new content that aggregates a variety of new content into a single page. However, the user may wish to send notices only about new blog entries and new reviews only to the user's closest non-family friends. Further, the user may wish to send notices only about new blog entries to certain co-workers. Embodiments of the present invention enable publishing users to control notices and viewing of information by other users, and generally to enhance experiences relating to an online social network and/or other networks.

Conversely, a receiving user may wish to receive notices about new photos, new blog entries, and new reviews posted by family members. The user may generally wish to receive the notices and a summary of the new content that aggregates a variety of content into a single page. However, the user may wish to receive notices only about new blog entries and new reviews posted by the user's closest non-family friends. Further, the user may wish to receive notices only about new blog entries by certain co-workers. Embodiments of the present invention enable users to control notices and viewing of information from other users, and generally to enhance experiences relating to an online social network and/or other networks.

Illustrative Operating Environment

Figure 1:
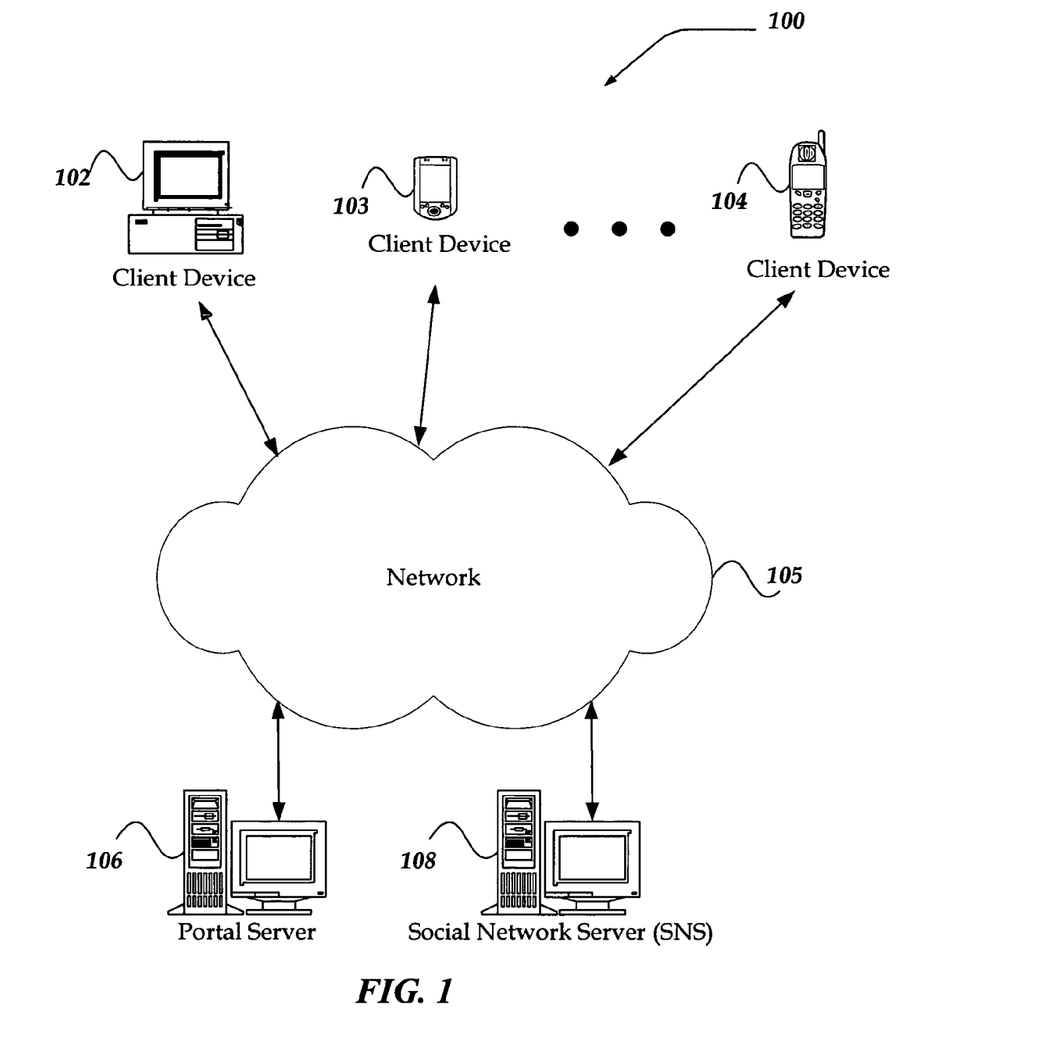
FIG. 1 shows a functional block diagram illustrating one embodiment of an environment for practicing the invention.

FIG. 1 illustrates one embodiment of an environment in which the present invention may operate. However, not all of these components may be required to practice the invention, and variations in the arrangement and type of the components may be made without departing from the spirit or scope of the invention.

As shown in the figure, system 100 includes client devices 102-104, network 105, an optional portal server 106, and a social network server (SNS) 108. Network 105 is in communication with and enables communication between each of client devices 102-104, portal server 106, and SNS 108.

Client devices 102-104 may include virtually any computing device capable of receiving and sending a message over a network, such as network 105, to and from another computing device, such as SNS 108, each other, and the like. The set of such devices may include devices that typically connect using a wired communications medium such as personal computers, multiprocessor systems, microprocessor-based or programmable consumer electronics, network PCs, and the like. The set of such devices may also include devices that typically connect using a wireless communications medium such as cell phones, smart phones, pagers, walkie talkies, radio frequency (RF) devices, infrared (IR) devices, CBs, integrated devices combining one or more of the preceding devices, or virtually any mobile device, and the like. Similarly, client devices 102-104 may be any device that is capable of connecting using a wired or wireless communication medium such as a PDA, POCKET PC, wearable computer, and any other device that is equipped to communicate over a wired and/or wireless communication medium.

Each client device within client devices 102-104 may include a browser application that is configured to send, receive, and display web pages, and the like. The browser application may be configured to receive and display graphics, text, multimedia, and the like, employing virtually any web based language, including, but not limited to Standard Generalized Markup Language (SMGL), such as HyperText Markup Language (HTML), extensible markup language (XML), a wireless application protocol (WAP), a Handheld Device Markup Language (HDML), such as Wireless Markup Language (WML), WMLScript, JavaScript, and the like.

Client devices 102-104 may be further configured to receive a message from another computing device employing another mechanism, including, but not limited to email, Short Message Service (SMS), Multimedia Message Service (MMS), instant messaging (IM), internet relay chat (IRC), mIRC, Jabber, and the like.

Client devices 102-104 may be further configured to enable a user to manage a user profile, degrees of relationships, categories of relationships, relationship ratings, activity participation, and the like, which may in turn be saved at a remote location, such as SNS 108, and the like. As such, client devices 102-104 may further include a client application that is configured to manage various actions on behalf of the client device. For example, the client application may enable a user to interact with the browser application, email application, and the like, to customize how another social network user might view a persona, profile, or the like associated with the user. For example, the user may employ the client application, in part, to provide one customized view for family members, another customized view for poker members, yet another view for fishing buddies, and the like. The client application may interact with a process such as described below to customize and manage such views, and enable a user to control which new information from other users will be displayed to the user.

Network 105 is configured to couple one computing device to another computing device to enable them to communicate. Network 105 is enabled to employ any form of computer readable media for communicating information from one electronic device to another. Also, network 105 may include a wireless interface, and/or a wired interface, such as the Internet, in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, network 105 includes any communication method by which information may travel between client devices 102-104, portal server 106, and/or SNS 108.

The media used to transmit information in communication links as described above illustrates one type of computer-readable media, namely communication media. Generally, computer-readable media includes any media that can be accessed by a computing device. Computer-readable media may include computer storage media, communication media, or any combination thereof.

Additionally, communication media typically embodies computer-readable instructions, data structures, program modules, or other data in a modulated data signal such as a carrier wave, data signal, or other transport mechanism and includes any information delivery media. The terms "modulated data signal," and "carrier-wave signal" includes a signal that has one or more of its characteristics set or changed in such a manner as to encode information, instructions, data, and the like, in the signal. By way of example, communication media includes wired media such as twisted pair, coaxial cable, fiber optics, wave guides, and other wired media and wireless media such as acoustic, RF, infrared, and other wireless media.

Portal server 106 and SNS 108 may comprise multiple computing devices or a single computing device. Portal server 106 may provide online services such as messaging, search, news, shopping, advertising, and/or the like. SNS 108 may provide similar service and/or other services that also enable users to centralize the sharing of information and viewing of information regarding other users and themselves. For example, users may have a personal web site to share and view online journals (e.g., blogs), photos, reviews, and the like. For exemplary purposes, the operations of portal server 106 and SNS 108 are described together, and generally refer to SNS 108. Briefly, SNS 108 may include any computing device capable of connecting to network 105 and may manage customization of views associated with a social network user, such as a user of at least one of client devices 102-104. Devices that may operate as SNS 108 include dedicated servers, personal computers, desktop computers, multiprocessor systems, microprocessor-based or programmable consumer electronics, network PCs, and the like.

SNS 108 may be configured to send and/or receive information associated with a client user and to enable the user to customize a distribution and/or view based in part, on the information. The information may include, but is not limited to, relationship degree information, relationship category information, relationship rating information, membership information associated with a category, type of content information, device information, presence information, profile information, activity information, and the like.

SNS 108 may further employ the information to enable the user to customize a view associated with a social network perspective, based in part on a degree of relationship, relationship categorization, relationship rating, and/or other criteria. By sharing varying quantities of personal information with other social network users, the user may put forth different online profiles, public personas, and the like. The user may also determine how information about, published by, and/or from the user will be displayed to other users. The criteria employed to enable customization of the views may include, but is not limited to, degrees of separation, category of relationship (such as friend, family, colleague, and the like), as well as any assessment of closeness, trust, an offline group affiliation, an online group affiliation, and the like. SNS 108 may also enable the user to preview a view resulting from applying the criteria.

SNS 108 may also enable another social network user, such as a user of one of client devices 102-104, to view the customized view based on the criteria. SNS 108 may employ a web service, email service, and the like, to make the customized view available to the other social network user, as appropriate. SNS 108 may employ processes such as described in more detail below to manage the customized views, and enable a social network user to control distribution and receipt of new information to and from other users of SNS 108. SNS 108 may be implemented on one or more computing devices, such as a server described with regard to FIG. 2.

Illustrative Server Environment

Figure 2:
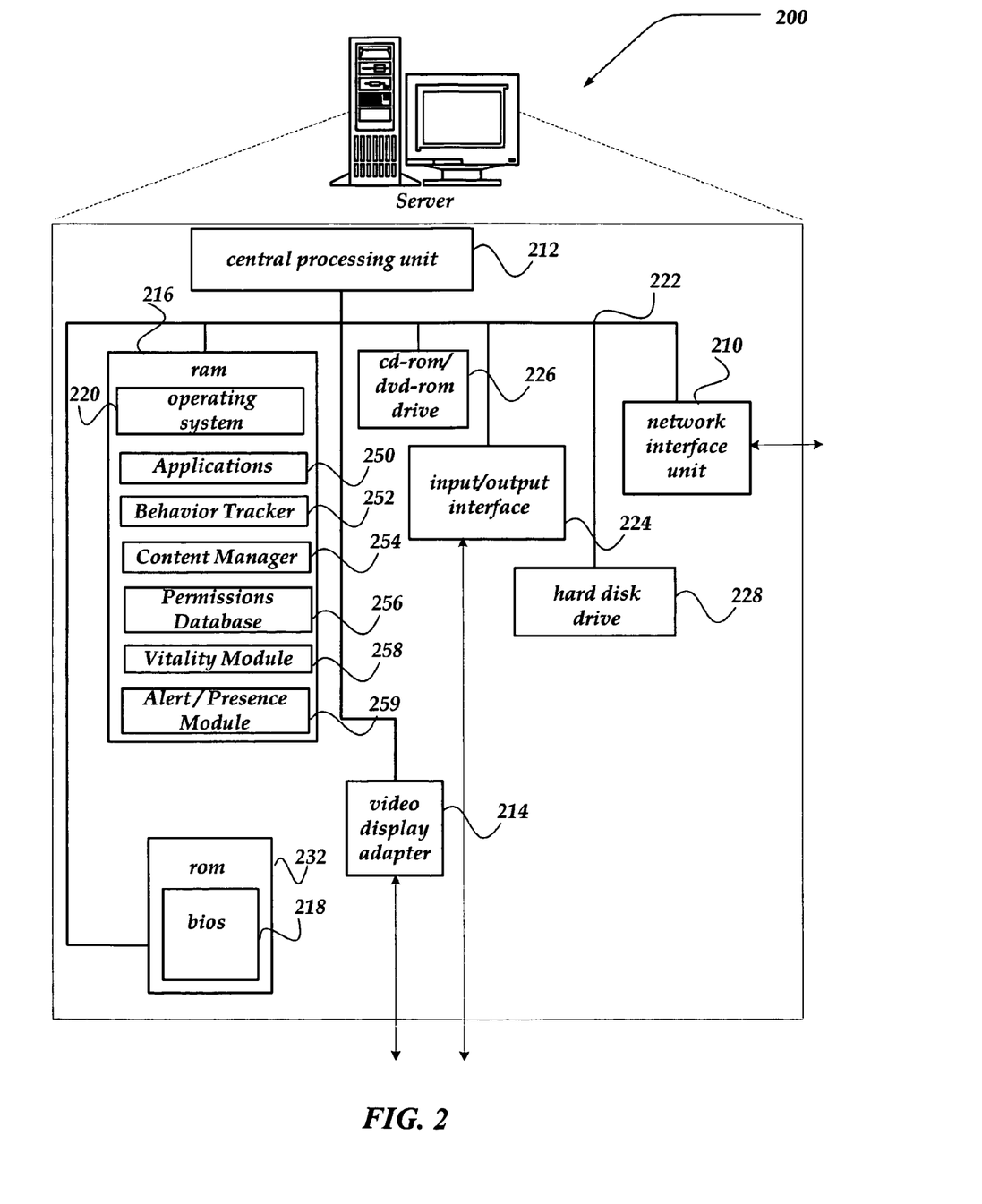
FIG. 2 shows one embodiment of a server device that may be included in a system implementing the invention.

FIG. 2 shows one embodiment of a server, according to one embodiment of the invention. Server 200 may include many more components than those shown. The components shown, however, are sufficient to disclose an illustrative embodiment for practicing the invention.

Server 200 includes processing unit 212, video display adapter 214, and a mass memory, all in communication with each other via bus 222. The mass memory generally includes RAM 216, ROM 232, and one or more permanent mass storage devices, such as hard disk drive 228, tape drive, optical drive, and/or floppy disk drive. The mass memory stores operating system 220 for controlling the operation of server 102. Any general-purpose operating system may be employed. Basic input/output system ("BIOS") 218 is also provided for controlling the low-level operation of server 200. As illustrated in FIG. 2, server 200 also can communicate with the Internet, or some other communications network, such as network 105 in FIG. 1, via network interface unit 210, which is constructed for use with various communication protocols including the TCP/IP protocol. Network interface unit 210 is sometimes known as a transceiver, transceiving device, network interface card (NIC), and the like.

The mass memory as described above illustrates a type of computer-readable media, namely computer storage media. Computer storage media may include volatile, nonvolatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory also stores program code and data. One or more applications 250 are loaded into mass memory and run on operating system 220. Examples of application programs include email programs, schedulers, calendars, web services, transcoders, database programs, word processing programs, spreadsheet programs, and so forth. Mass storage may also include applications such as a behavior tracker 252, which may track a user's online activities with the user's permission. Behavior tracker 252 may track the user's portal service behaviors (e.g., web searches, online purchases, etc.), the user's social network service behaviors (e.g., frequency of inviting others to join, frequency of posting blog entries, participation in particular social network activities, etc.), and/or other behaviors.

Mass storage may further include modules that are useful for managing a user's social network, such as a content manager 254, a permissions database 256, a vitality module 258, and an alert/presence module 259. Content manager 254 may include a database, text, folder, file, and the like, that is configured to maintain and store information that the user wishes to use and/or share with a social network. Content may include the user's profile information, online journals (e.g., blogs), reviews of products and/or services, photographs, and the like. The content may be entered by the user or obtained from other sources. The content may be used only with the social network or with other services, such as the portal service, data feed services, and the like. The content, and modules to control the content, may be centralized or distributed over a number of resources.

Permissions database 256 may be included with content manager 254 or provided as a separate entity. Permissions database 256 may enable the user to establish and store content access permission based on user relationships, types of content, and the like. User relationships may include relationship degrees (e.g., $1^{st}$, $2^{nd}$, $3^{rd}$, etc.), user-definable relationship categories (e.g., family, co-workers, fishing buddies, etc.), relationship ratings (e.g., closest, close, connected, acquainted, haven't met, etc.), and/or other forms of relationships.

Vitality module 258 may be included with permissions database 256 or provided as a separate entity. Vitality module 258 generally controls notifications about new information posted by users. Vitality module 258 enables a user to define which co-users from which the user wishes to receive notices of new information posted by the co-users, and which co-users to which the user wishes to receive notices of new information posted by the user. Vitality module 258 also enables a user to control which type of information about which the user wishes to receive or send notices. Accordingly, vitality module 258 checks new information and prepares notices to corresponding users.

Alert/Presence module 259 may be included with vitality module 258 or provided as a separate entity. Alert/Presence module 259 enables a user to control how information is to be delivered to the user. For example, the user may indicate that all notices and/or other communications should be sent as a SMS message to mobile devices. Vitality module 258 may confer with alert/presence module 259 before delivering a notice of new information posted by the user or by co-users.

Server 200 also includes input/output interface 224 for communicating with external devices, such as a mouse, keyboard, scanner, or other input devices not shown in FIG. 2. Likewise, server 200 may further include additional mass storage facilities such as CD-ROM/DVD-ROM drive 226 and hard disk drive 228. Hard disk drive 228 is utilized by server 200 to store, among other things, application programs, databases, content manager 254, permissions database 256, invitation IDs database 257, invitation module 258, and the like.

Illustrative Client User Interface

Figure 3:
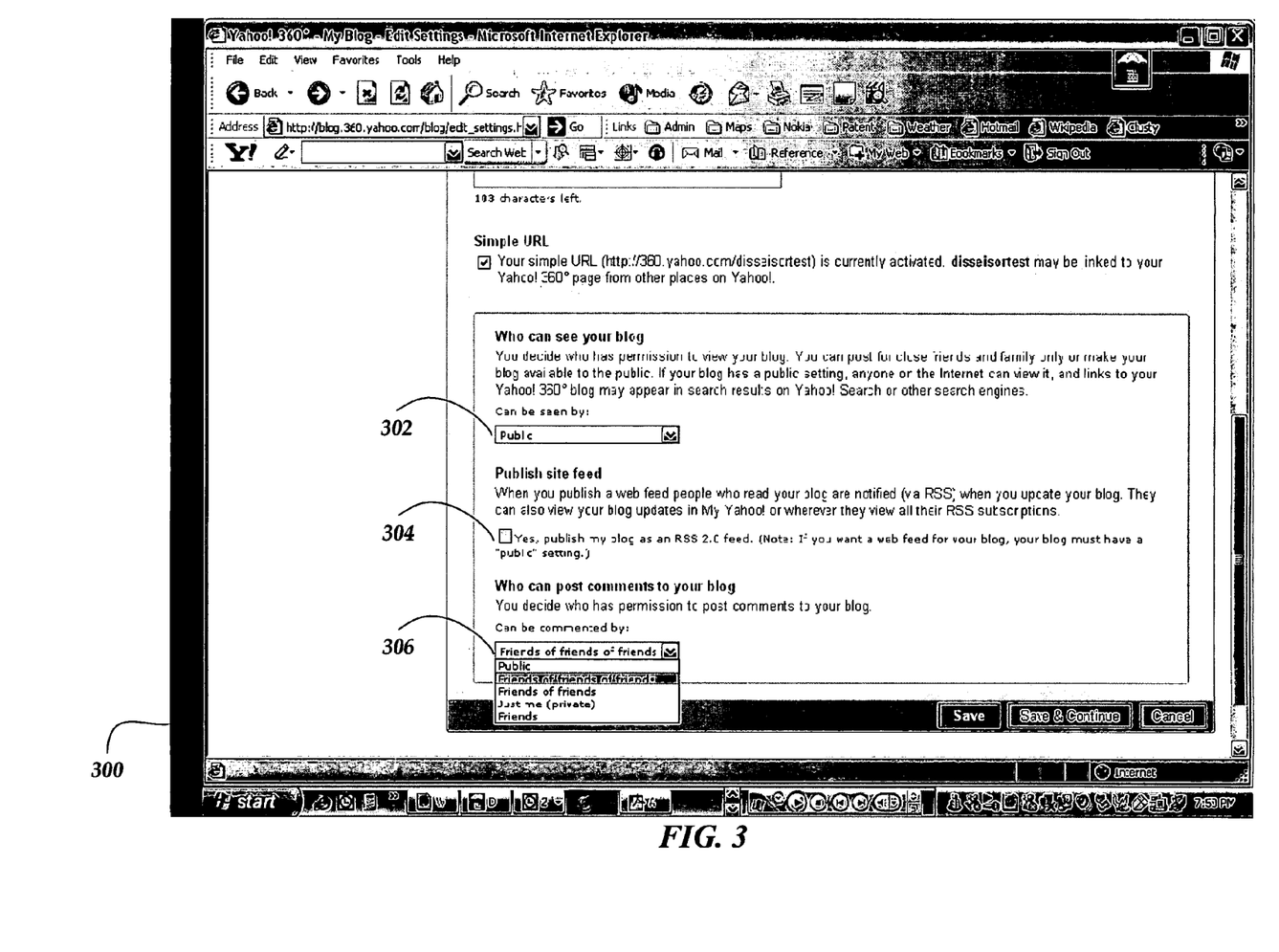
FIG. 3 shows a screen shot of a client user interface, illustrating a sample settings page for a publishing user of blog for an online social network service.

A user interface and operation of certain aspects of an embodiment of the present invention will now be described with respect to FIGS. 3 and 4. FIG. 3 shows a screen shot of a client user interface 300, illustrating a sample settings page for a publishing user to control access to the user's blog for an online social network service. Similar settings pages are available for controlling access to the user's photos, written reviews, and the like. As shown, a publishing user can control which group(s) of co-users can access the publishing user's blog. A blog access selection field 302 enables the publishing user to specify which level of relationship is required for a co-user to see the publishing user's blog. For example, the publishing user may specify that all users of the public may view the publishing user's blog. Alternatively, the publishing user may specify that only user's with a first degree relationship with the publishing user (e.g., friends) may access the publishing user's blog. Greater degrees of relationship may be selected as alternative (e.g., only friends of friends, only friends of friends of friends, only the publishing user, etc.). The publishing user may also specify how the blog is published or accessed. For example, the publishing user may select an RSS feed box 304 to publish the blog as an RSS feed. The publishing user may further specify a relationship level required for a co-user to post a comment to the publishing user's blog. A blog comment selection field 306 may provide the same or different menu of relationship degrees as blog access field 302. Other relationships may include categories of first degree relationships, such co-workers, local neighbors, poker friends, and the like. Similar settings pages, drop down menus, and/or other selection or input fields can be used by a receiving user to control which updates are received by the receiving user.

Figure 4:
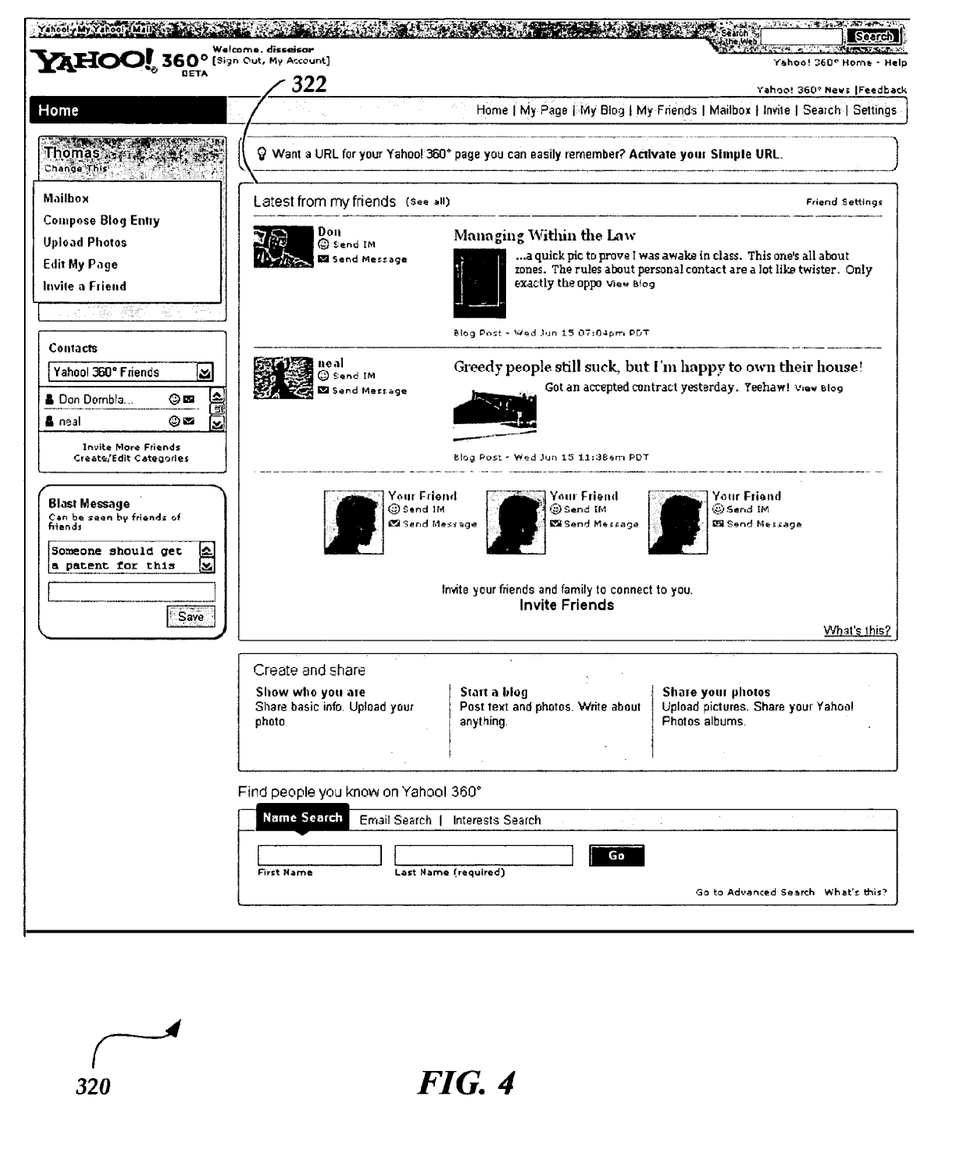
FIG. 4 shows a screen shot of a client user interface, illustrating a sample home page with a vitality section for a receiving user of an online social network service.

FIG. 4 shows a screen shot of a client user interface 320, illustrating a sample home page for a user of an online social network service. The user's home page generally acts as a central point from which the user may access a variety of information and/or services, such as email, instant messaging, blogs, photos, and the like. The home page also includes a vitality section 322, which displays the most recent posting of selected information from related co-users. As discussed below, vitality section 322 includes types of information selected by the user. The information is from co-users that correspond to user relationship settings chosen by the user. Additional and/or more detailed information about postings from co-users may be provided on a separate vitality page in addition to, or as an alternative to vitality section 322 on the user's home page.

Illustrative Architecture and Logic

Figure 5:
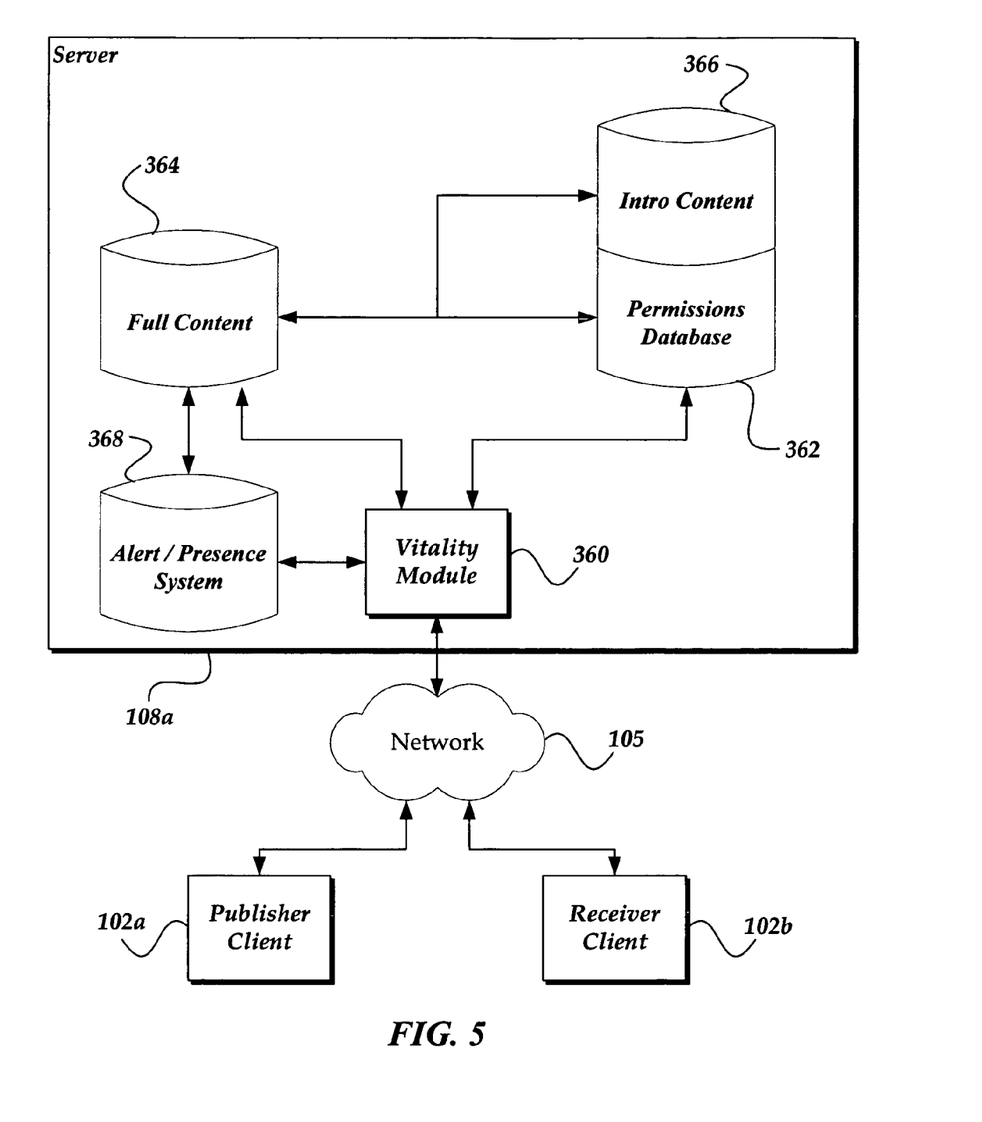
FIG. 5 illustrates an example software architecture for controlling information updates between co-users.

FIG. 5 illustrates an exemplary architecture that may be used to enable a publisher client 102a and a receiver client 102b to control receipt and distribution of content postings and/or updates (either sometimes referred to as updates). Publisher client 102a and receiver client 102b may communicate through network 105 to a server 108a. In this sample architecture, the server includes a vitality module 360 that generally manages notification of newly published content and/or content updates. Vitality module 360 communicates with a permissions database 362 that may comprise an access control list or other data store. Permission database 362 generally maintains associations between user relationships and content. Registered clients, such as publisher client 102a and receiver client 102b, may specify one or more user relationships required to be associated with an update before the receiver client is permitted access to the update and/or before the receiver client will accept the update. For example, publisher client 102a may specify that notices of updated content will be sent to other users with a third degree relationship (or closer) to the publisher client 102a (e.g., a friend of a friend of a friend). Similarly, receiver client 102b may specify that notices of updated content will be accepted from other users with a second degree relationship (or closer) to the receiver client 102b (e.g., a friend of a friend). Receiver client 102b may also specify that only blog updates will be received from other users with the second degree relationship.

Permission database 362 may also maintain associations between user relationships and the content of the updates. For example, publisher client 102a may specify that updates about some profile information may be accessed by other users with a second degree relationship (or closer) to publisher client 102a (e.g., a friend of a friend). Publisher client 102a may specify that other portions of profile information may be accessed only by other users with a first degree relationship. Either client may further specify a default level. These assignments may be stored in, or accessed by permissions database 362.

Permissions database 362 and vitality module 360 also communicate with a full content data store 364, which maintains the blogs, profile information, lists, and/or other content provided by the clients. Optionally, full content data store 364 and permissions database 362 may communicate with an intro content data store 366, which may store one or more subsets of content. The subsets of content may generally have the same permissions assigned as the corresponding full content. The subsets generally comprise introductory content such as the first twenty-five words of a blog entry, the first couple of items on a list, titles of reviews, thumb nail photos of friends, and/or other content that provides initial information about full content.

Vitality module 360 determines which content to accesses and provide as an update, based on the user relationship associated with the clients and the content. The vitality module also prepares the notice and/or updated content for delivery to receiver client 102b. To determine how to deliver the notice and/or updated content, vitality module 360 may communicate with an alert/presence system 368. The alert/presence system stores delivery preferences and/or presence settings that indicate a receiver client's current preferred mode of receiving information. Vitality module 360 may check for the delivery preferences and/or presences before delivering notices and/or updated content. Alternatively, the alert/presence system may actually deliver the notices and/or updated content. In another embodiment, substantially all of the relevant notices and/or updated content may be delivered to receiver client 102b, which may filter the notices and/or content for viewing based on the user relationship(s) selected by receiver client 102b. Similarly, the publisher client may specify the method in which content is to be delivered. Vitality module 360 may determine which receiver clients are capable of receiving the content as specified by the publisher client.

Figure 6:
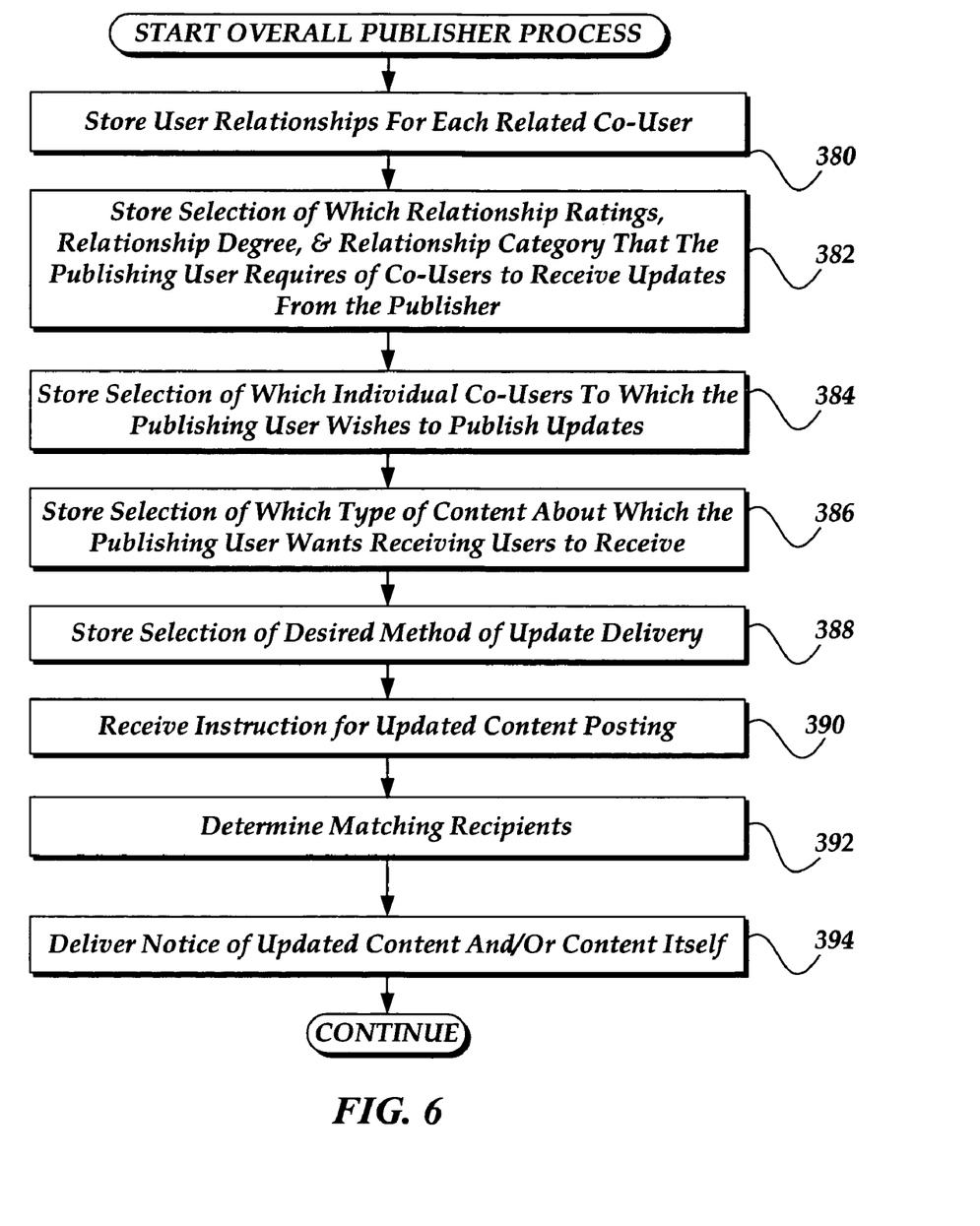
FIG. 6 illustrates an example logical flow diagram generally showing one embodiment of a process for controlling information updates published to co-users.

FIG. 6 is a flow diagram illustrating exemplary logic of an overall process that enables the publishing client to control posting of updated content (and/or notices thereof). At an operation 380, the publishing client user selects user relationships for related co-users. Alternatively or in addition, user relationships are determined by tracked behaviors. Often, the related co-users to which the publishing user will want to send updates, will have a greater degree relationship with the publishing user (although the publishing user may wish to publish certain updates only to co-users at smaller degree of relationship). For desired co-users, the publishing user may specify relationship categories, such as family, classmate, fishing buddy, and the like. Similarly, the publishing user may assign a relationship rating to co-users, such as closest, close, connected, acquainted, and the like. The publishing user may use a client user interface to specify the user relationships and communicate the specified user relationships to the server for storage in the permissions database.

At an operation 382, the publishing user may utilize the user interface to specify which relationship degrees, relationship categories, and/or relationship ratings must be associated with an receiving co-user, for the updated content to be accessible to the receiving co-user. The publishing user may also select individual co-users at an operation 384 to which the publishing user wishes to allow access to updates. For example, the publishing user may wish to send updated content to the leader of a group, even if the publishing user does not have a first degree relationship with the leader. As discussed above, the leader may specify the level of relationship required of publishing users before the leader will accept such updates. At an operation 386, the publishing user may specify certain types of content that the publishing user wishes to make available. For example, the publishing user may only wish to send new product reviews to co-user with a close relationship assigned. The publishing user may further specify a desired method of deliver at an operation 388. This may be indicated as a delivery setting, which may affect other transmitted information such as email, instant messages, and the like. Alternatively, the delivery method may apply only to updates to co-users of the online social network.

At an operation 390, the server detects an instruction from the publishing user to updated a content posting. The updated content may be new content or revised content. The detection may occur substantially immediately after the publishing user issues the instruction or at a predefined time, such as during a batch process. At an operation 392, the server accesses the permissions database for the relationship, delivery, and other settings specified by the publishing user, as discussed above. The server identifies co-users that match the publishing user's settings. The matching may occur with every new posting, when a setting is changed, at predefined intervals, and/or at other times or events.

At an operation 394, the server generates a notice, summary, and/or other update content. The update content is formatted, truncated, summarized, and/or otherwise prepared for delivery to matched users for display and/or other presentation. At an operation 396, the server determines the publishing user's preferred delivery method (if one is specified), and delivers the notice and/or updated content to the matching users.

Figure 7:
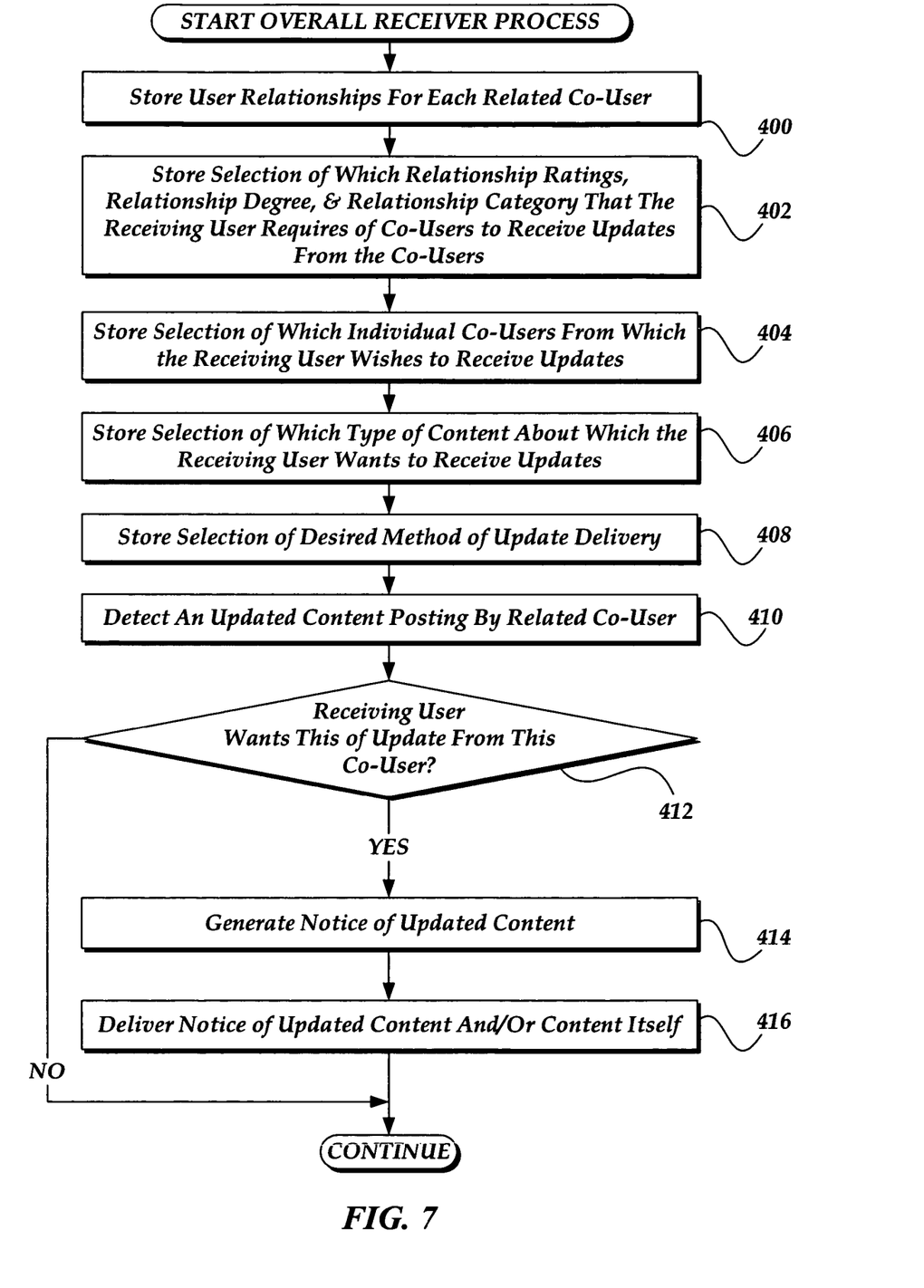
FIG. 7 illustrates an example logical flow diagram generally showing one embodiment of a process for controlling information updates received from co-users.

FIG. 7 is a flow diagram illustrating exemplary logic of an overall process that enables the receiver client to receive updated content (and/or notices thereof). At an operation 400, the receiving client user selects user relationships for related co-users. Alternatively or in addition, user relationships are determined by tracked behaviors. Generally, the related co-users from which the receiving user will want to receive updates, will have a first degree relationship with the receiving user (although the receiving user may wish to also receive updates from co-users at greater degrees of relationship). For desired co-users, the receiving user may specify relationship categories, such as family, classmate, fishing buddy, and the like. Similarly, the receiving user may assign a relationship rating to co-users, such as closest, close, connected, acquainted, and the like. The receiving user may use a client user interface to specify the user relationships and communicate the specified user relationships to the server for storage in the permissions database.

At an operation 402, the receiving user may utilize the user interface to specify which relationship degrees, relationship categories, and/or relationship ratings must be associated with an updating co-user, for the receiving user to accept an update from the updating co-user. The receiving user may also select individual co-users at an operation 404 from which the receiving user wishes to receive updates. For example, the receiving user may wish to receive updated content posted by the leader of a group, even if the receiving user does not have a first degree relationship with the leader. At an operation 406, the receiving user may specify certain types of content that the receiving user wishes to receive. For example, the receiving user may only wish to receive new product reviews from co-user with a close relationship assigned. The receiving user may further specify a desired method of deliver at an operation 408. This may be indicated as a presence setting, which may affect other incoming information such as email, instant messages, and the like. Alternatively, the delivery method may apply only to updates from co-users of the online social network.

At an operation 410, the server detects an updated content posting from a related co-user. The updated content may be new content or revised content. The detection may occur when the receiving user logs into the online service or while the receiving user is already logged in and updated content is posted. The detection may be given a range of time period, number of updates, and the like. For example, when the receiving user logs into the online social network service, the server may check for the last five updates over the past three months from each related co-user, according to the selections discussed above. Based on those selections, the server determines at a decision operation 412, whether the receiving user wishes to receive a particular update. The decision may depend on the type of content, the co-user making the update, the relationship to the receiving user, and/or other factors.

If the server determines that the receiving user wishes to receive the update, the server generates a notice, summary, and/or other update content at an operation 414. The update content is formatted, truncated, summarized, and/or otherwise prepared for delivery to the receiving user via the vitality section or vitality page displayed to the receiving user. At an operation 416, the server determines the receiving user's currently preferred delivery method, and delivers the notice and/or updated content to the receiving user. The notice and/or update preparation and delivery are not performed if the server determines that receiving user does not wish to receive the content from the publishing co-user.

The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent of the United States is:

1. A method comprising:
   storing, via a computing device, a selected relationship between a publishing user in a social network and a receiving user in the social network, wherein the selected relationship indicates a degree of a personal relationship between the publishing user and the receiving user in the social network, the selected relationship based on portal behaviors that are tracked as they occur outside of the social network separate from interactions with any other user and social network behaviors within the social network for both the receiving user and the publishing user;
   storing, via the computing device, a required relationship between the publishing user and the receiving user, wherein the required relationship is needed to make an electronic content update accessible to the receiving user;
   detecting, via the computing device, an instruction from the publishing user to make available the electronic content update, which is associated with the publishing user; and
   enabling, via the computing device, the receiving user to access the electronic content update if the selected relationship comprises the required relationship.

2. The method of claim 1, further comprising enabling the publishing user to select the selected relationship and to specify the required relationship.

3. The method of claim 1, further comprising assigning the required relationship based on one of the following; a publishing user setting; a receiving user setting; and a default setting.

4. The method of claim 1, wherein the required relationship comprises at least one of the following:
   a degree of relationship between the publishing user and the receiving user;
   a category of relationship between the publishing user and the receiving user; and
   a rating of the relationship between the publishing user and the receiving user.

5. The method of claim 1, wherein the electronic content update includes at least one of the following; profile information, a blog entry, a review, a list, an image, information about a related user; information about a group to which the publishing user belongs, and a message.

6. The method of claim 1, wherein the electronic content update comprises a content item created within a predefined period of time.

7. The method of claim 1, further comprising:
   storing a content type needed to make the electronic content update available to the receiving user; and making the electronic content update available to the receiving user if the electronic content update comprises the content type.

8. The method of claim 1, wherein the instruction is detected at one of the following:
upon a command by the publishing user;
at a predetermined time;
upon login of the receiving user; and
upon posting of the electronic content update.

9. The method of claim 1, further comprising generating a summary of the electronic content update for display in a portion of a user interface.

10. The method of claim 1, further comprising:
detecting a selected delivery method; and
delivering the electronic content update according to the selected delivery method for access by the receiving user.

11. The method of claim 1, further comprising:
identifying a priority publishing user; and
enabling the receiving user to access the electronic content update if the publishing user is the priority publishing user regardless of whether the selected relationship comprises the required relationship.

12. The method of claim 1, wherein the method is performed by a mobile device.

13. A server comprising:
a communication interface in communication with a publishing user client and a receiving user client;
a memory for storing instructions; and
a processor in communication with the communication interface and with the memory, wherein the processor performs actions based at least in part on the stored instructions, including:
storing a selected relationship between a publishing user and a receiving user in a social network, the selected relationship based on portal behaviors that are tracked as they occur outside of the social network separate from interactions with any other user and social network behaviors within the social network for both the receiving user and the publishing user;
storing a required relationship between the publishing user and the receiving user, wherein the required relationship specifies a degree of a personal relationship between the publishing user and the receiving user needed to make a variable quantity of personal information comprised in an electronic content update in the social network accessible to the receiving user, and wherein the variable quantity of personal information in the electronic content update that is accessible in the social network varies for a plurality of receiving users based on at least a plurality of specified degrees of personal relationships between the publishing user and the plurality of receiving users;
detecting an instruction from the publishing user to make available the electronic content update, wherein the electronic content update is associated with the publishing user; and
enabling the receiving user to access the electronic content update if the selected relationship comprises the required relationship.

14. The server of claim 13, wherein the processor further performs the action of enabling the publishing user to select the selected relationship and to specify the required relationship.

15. The server of claim 13, wherein the required user relationship comprises at least one of the following: a degree of relationship between the receiving user client and the publishing user client; a category of relationship between the receiving user client and the publishing user client; and a rating of the relationship between the receiving user client and the publishing user client.

16. The server of claim 13, further comprising: communicating with a deliver system to determine a currently selected delivery method; and delivering the electronic content update according to the selected delivery method for access by the receiving user.

17. The server of claim 13, wherein the server provides an online social network service.

18. A method comprising:
providing, via a computing device, a publisher user interface that enables a publishing user to associate a publisher-selected relationship with a receiving user;
enabling, via the computing device, the publishing user to use the publisher user interface to specify one of a plurality of publisher-required degrees of a personal relationship needed for each of a plurality of receiving users to access personal information in the electronic content, wherein the specified publisher-required relationship enables the publishing user to customize how the receiving user views a persona associated with the publishing user, and wherein the persona comprises a variable quantity of the personal information in the electronic document, the degree of personal relationship for each one of the plurality of receiving users based on portal behaviors that are tracked as they occur outside the social network separate from interactions with any other user and social network behaviors within the social network for both the publishing user and each of the plurality of receiving users;
enabling, via the computing device, the publishing user to provide an instruction to make available an electronic content update, wherein the electronic content updated is associated with the publisher user;
providing, via the computing device, a receiver user interface that enables a receiving user to associate a receiver-selected relationship with the publishing user;
enabling, via the computing device, the receiving user to use the receiver user interface to specify a receiver-required user relationship needed to access the electronic content; and
enabling, via the computing device, the receiving user to access the electronic content if the publisher-selected relationship comprises the publisher-required user relationship and the receiver-selected relationship comprises the receiver-required relationship.

19. The method of claim 18, wherein the publisher-selected relationship is based at least in part on a behavior of the receiving user in interacting with an online service.

20. The method of claim 18, wherein the method is performed by a mobile device.

* * * * *